Sept. 17, 1940.     J. VOTYPKA     2,215,022
VEHICLE BODY
Filed March 1, 1937     2 Sheets-Sheet 1

INVENTOR
John Votypka.
BY Dike, Calver & Gray
ATTORNEYS.

Sept. 17, 1940.                J. VOTYPKA                    2,215,022
                               VEHICLE BODY
                           Filed March 1, 1937           2 Sheets-Sheet 2

INVENTOR
John Votypka.
BY Dike, Calver & Gray
ATTORNEYS.

Patented Sept. 17, 1940

2,215,022

UNITED STATES PATENT OFFICE 2,215,022

VEHICLE BODY

John Votypka, Detroit, Mich., assignor to Briggs Manufacturing Company, Detroit, Mich., a corporation of Michigan Application March 1, 1937, Serial No. 128,379

2 Claims. (Cl. 296—137)

This invention relates to vehicle bodies and more particularly, although not exclusively, to closed automobile bodies of the type having an opening in the roof thereof controlled by means of a sliding roof panel. The present application is a continuation-in-part of my co-pending application Serial No. 89,065, filed July 6, 1936, now Patent No. 2,190,462, dated Feb. 13, 1940.

One of the objects of the present invention is to provide a closed vehicle body having a roof with an opening therein and a longitudinally slidable or adjustable roof panel supported, guided and controlled in an improved manner, whereby it is possible to attain in a closed vehicle body many advantages formerly possessed by bodies of the open type only.

Another object of the invention is to provide a vehicle body of the foregoing character in which means are provided enabling the occupants to enjoy in winter as well as in summer or during a rainy season the advantages afforded by the open roof bodies.

Still another object of the invention is to provide a vehicle body having an opening in the roof thereof, which opening is adapted to be selectively covered with the aid of a sliding panel, and which is provided with easily removable transparent panels, thus permitting the sliding panel to be kept open in winter time or during rainy weather without inconveniencing the occupants of the vehicle.

A further object of the invention is to provide glass panels for the roof opening of a vehicle body, which are simple in construction and can be easily installed in said opening and removed therefrom without any special tools.

Other objects of this invention will appear in the following description and appended claims, reference being had to the accompanying drawings forming a part of this specification wherein like reference characters designate corresponding parts in the several views.

Fig. 1 is a perspective view of a vehicle body embodying the present invention.

Fig. 2 is a perspective view partly in section, showing in an enlarged scale the portion of the roof included in the small circle appearing at the left hand side of said Fig. 1.

Figure 1:
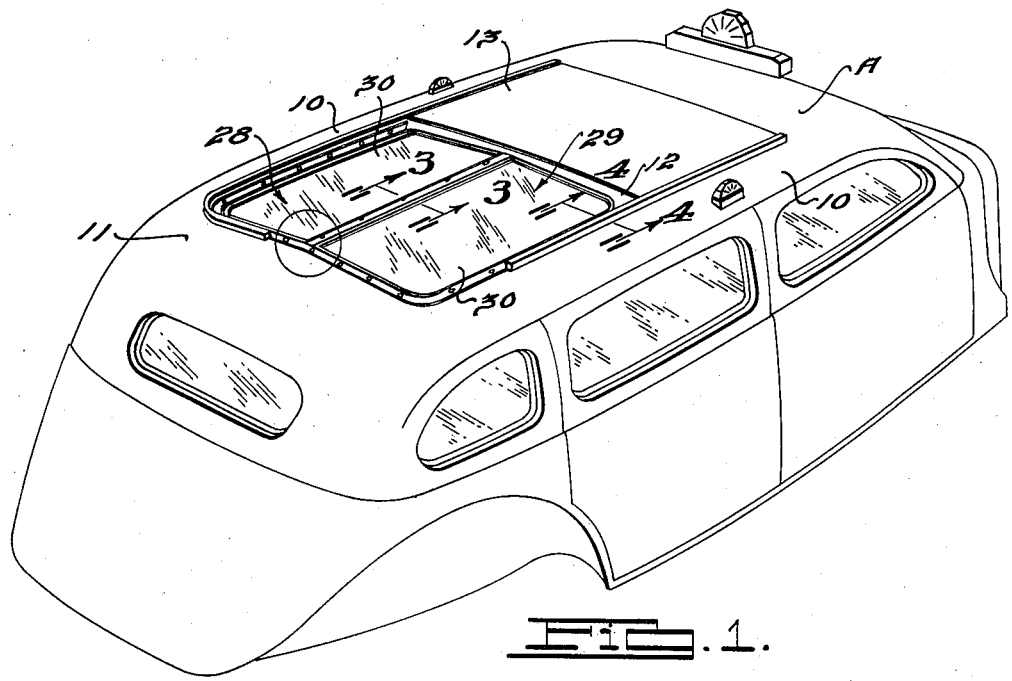

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle body embodying the present invention. The vehicle body is of the type described in detail in my co-pending application Serial No. 89,065, filed on July 6, 1936, and therefore the detailed description of said body herein presented is only of such a character as is necessary for a complete understanding of the present invention.

Referring to the drawings, the body illustrated therein is of the cab type and it has a metal roof A including side roof panels 10 and a rear panel 11, the roof being provided with a generally rectangular opening at its top which is adapted to be closed by means of a permanent top roof section 12 arranged preferably, although not necessarily, in the front portion of the roof opening, and a sliding metal roof panel 13 adapted to close the opening in rear of the permanent roof section 22. In the present instance the opening in the roof controlled by the sliding panel 13 is at the rear of the body, although it will be understood that the body may be constructed so that the sliding panel 13 will cover an opening located at the front portion of the roof.

Figure 2:
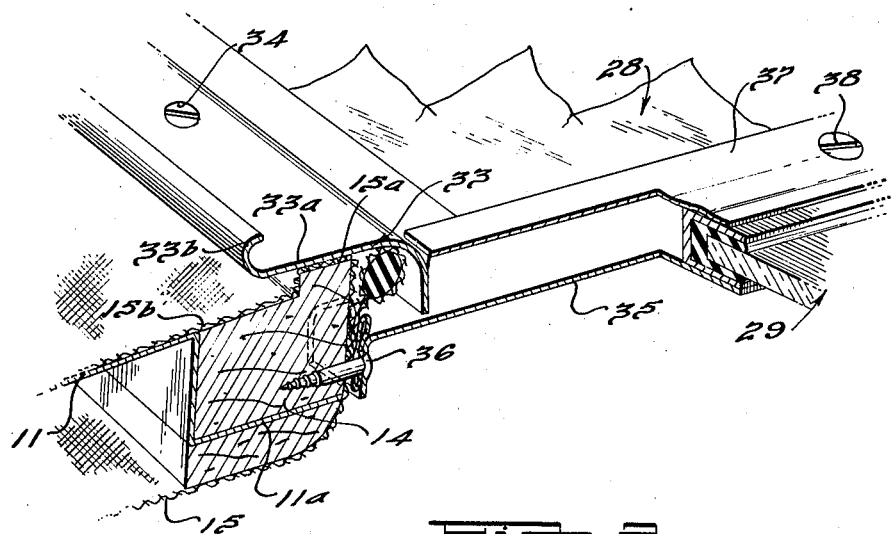
Figure 4:
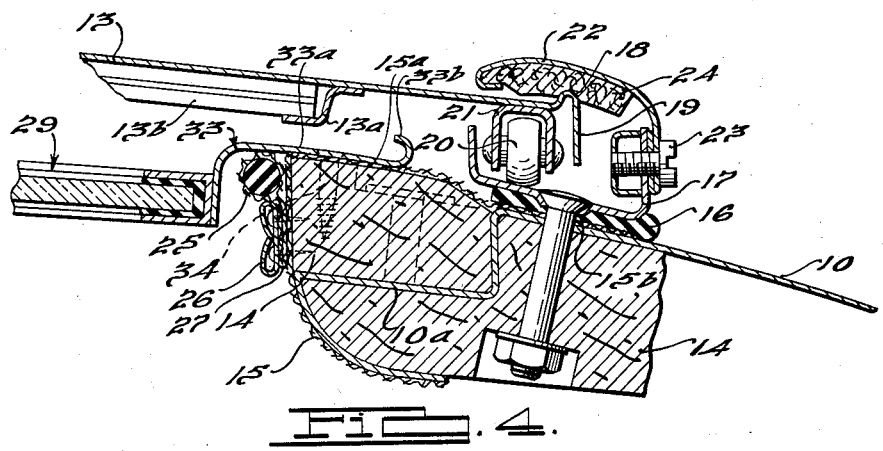
Fig. 4 is a sectional view taken on the line 4—4 of Fig. 1 looking in the direction of the arrows.

Within the roof opening in rear of the permanent roof section 12 is mounted a generally rectangular wood frame 14 which is supported upon the horizontal flanges 10a and 11a of the roof panels 10 and 11 as shown in Figs. 2 and 4 and is rigidly secured to said flanges.

The side walls and top portions of the roof within the interior of the passenger compartment, which is located below the rear opening in the roof, is upholstered by means of suitable material 15, which may, for example, consist of waterproofed imitation leather, said material extending around the upper marginal edge of the roof opening, being drawn back at 15a and extending outwardly as shown at 15b so as to overlie a substantial marginal portion of the roof panels 10 and 11 to which it is cemented (Fig. 4). Extending along the longitudinal sides and rear edge of the opening and overlying the edge portions 15b of the material 15 is a continuous flat rubber sealing strip 16, which is securely cemented to the material 15.

Mounted upon the sealing strip 16 is a three-sided U-shaped channel frame 17 securely fastened down to the side roof panels 10 so as to compress somewhat the rubber sealing strip 16 and to effect thereby a water-tight joint.

The sliding lid or roof panel 13 comprises a one-piece stamped or pressed metal sheet generally rectangular in shape and having formed therein around the four marginal edges thereof a continuous unbroken upstanding curved bead or rib 18 forming a part of a downturned vertical flange 19 extending continuously around the four sides of the panel. Retainer members 13a are provided and they hold the trim panels 13b in place. Mounted along each longitudinal side of the sliding panel 13 are a series of antifriction rollers 20, each of said rollers 20 being journalled in the vertical side flanges of a U-shaped bracket 21 spot welded to the panel 13, and adapted to travel on tracks formed by the bottom of the longitudinal members of the channel frame 17, the construction of the latter being such as to cause the panel 13 to slide longitudinally in a substantially rectilinear path into and out of position to close the roof opening. The roof panel 13 may be actuated in any suitable manner.

The sliding roof panel 13 is retained in operative engagement, and the rollers 20 are tensioned against the tracks by means of flexible or yieldable retainer caps or cover strips 22. These strips or members are of hood-like construction adapted to overhang and cover the channel or track members 17 and are secured to said members 17 by means of bolts 23. The cover strips 22 are adapted to support felt strips 24 embedding the bead 18 therein to provide an effective weather seal and at the same time to prevent undue resistance to the longitudinal movements of the roof panel 13, as well as to prevent chattering or vibration.

A fabric covered rubber weather cord 25 is secured to the frame 14 at the edges thereof around the roof opening, and a flexible finish or molding strip 26 is provided to conceal the heads of the tacks or nails by which the covering material 27 of said cord is tacked to the frame.

In accordance with the invention there is provided a transparent panel adapted to be inserted into the roof opening and to be secured therein in such a way that it does not interfere with the longitudinal movement of the roof panel 13. In the present embodiment of the invention said transparent panel is made up of two symmetrical half-panels. Each half-panel is shown as comprising a single glass pane although it may be composed of any practical number of smaller panes.

Figure 3:
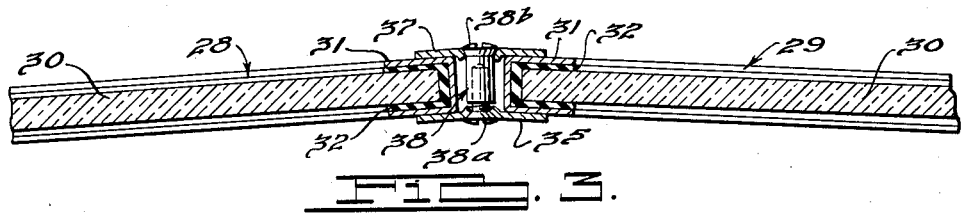
Fig. 3 is a sectional view taken on the line 3—3 of Fig. 1 looking in the direction of the arrows.

Referring to the drawings, the transparent panel employed in the present embodiment of the invention comprises two symmetrical half-panels 28 and 29 adapted to be fitted into the roof opening and to cover said opening when so fitted. Said half-panels 28 and 29 come together with a small clearance substantially along the longitudinal axis of the roof opening and they are set at a small angle with respect to each other along said axis thereby conforming to the roof curvature (Fig. 3). The half-panels 28 and 29 are similar in construction and therefore only one of said panels, namely the right hand side panel 29, is hereinafter described in detail, it being understood that the left hand half-panel 29 is constructed similarly, and that for each detail of construction of the half-panel 29 there is a corresponding part in the half-panel 28. The half-panel 29 comprises a glass plate 30 bound around its edges with a channel-shaped metal frame 31, a rubber gasket 32 being provided between the glass plate 30 and said metal frame 31 in order to ensure tightness and prevent rattling. Around the three sides of the half-panel there is spot welded or otherwise secured to said metal frame 31 a continuous lip 33 of angular cross section, the generally horizontal portion 33a of said lip terminating in an upstanding curved flange 33b. The generally horizontal portion 33a overlies and is adapted to rest upon the frame 14 to which it is secured with the aid of screws 34, thereby supporting the half-panel in the roof opening. The overlying portion 33a slopes outwardly and downwardly to the flange 33b which forms a gutter around the edges of the roof opening effective to prevent drainage of the rain water into the roof structure.

For supporting the half-panels 28 and 29 along the longitudinal axis of the roof opening there is provided a narrow metal plate 35 disposed in said roof opening along the longitudinal axis thereof and secured at its downwardly flanged ends to the frame 14 in any suitable manner, such as by means of screws 36. When the half-panels 28 and 29 are inserted into the roof opening their edges disposed along the longitudinal axis of the roof opening bear against the plate 35 and are supported thereby as is clearly shown in Figs. 2 and 3. In order to close the gap between the half-panels 28 and 29 and to hold said half-panels to the lower plate 35, there is provided an upper metal plate or strip 37 which is adapted to be disposed over the upper edges of the half-panels as shown in Fig. 3. The plates 35 and 37 are adapted to be connected together by means of a plurality of connectors 38. Each of said connectors 38 comprises an externally threaded screw 38a having a conical head fitting into a chamfered hole in the plate 35 and engaging with its threaded portion the internally threaded portion of the female screw 38b having a head fitted into a chamfered hole in the upper plate or strip 37. By relative rotation of said screws 38a and 38b the plates 35 and 37 may be drawn together gripping the edges of the half-panels 28 and 29.

It will now be understood in view of the foregoing that by virtue of the above described construction it is possible to open the sliding roof panel 13 during the winter months and to enjoy the sunshine or the increased amount of light admitted therethrough without bringing about the discomfort which might follow if the roof opening was entirely open in cold or rainy weather. The insertion and removal of the half-panels 28 and 29 can be easily done with the aid of a screw driver only, and the same does not require any particular skill.

Figure 5:
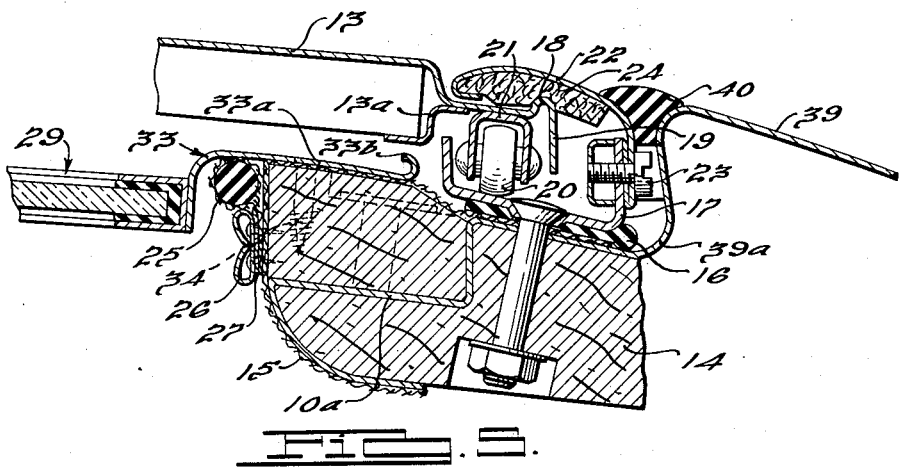
Fig. 5 is a view similar in part to Fig. 4, showing a modified structure embodying the invention.

The structure shown in Fig. 5 represents a modified type of the roof structure embodying the invention and it differs from the structure illustrated in Figs. 1 to 4, inclusive, in the respect that the sliding roof panel 13 is made substantially flush with the side roof panels 39. In said structure the roof panels 39 are provided with sunk portions 39a adapted to receive the channel members 17 and the cover strips 22. Rubber gaskets 40 are provided between said side roof panels 39 and strips 22 for the purpose of preventing water leakage. Thus, the sliding roof panel 13, the cover strips 22, sealing members 40 and side roof panels 39 all lie approximately flush with one another.

I claim:

1. In a vehicle body, a roof structure comprising a cover sheet having therein an opening of a substantially rectangular shape uncovering not more than one-half of the roof area, an integral depending flange on said sheet around at least three sides of said opening, inwardly extending flange portions on the lower edges of said flange forming an angle therewith, a substantially rectangular frame fitted into said angle and supported by said flange portions below the plane of the cover sheet, and defining the margins of a skylight opening, and a substantially rectangular glass panel fitted into said frame to close said skylight opening, said glass panel including a metal frame and an outwardly extending flange on said metal frame adapted to rest on said rectangular frame when the glass panel is in its operative position.

2. In a vehicle body, a roof structure comprising a cover sheet having therein an opening of a substantially rectangular shape uncovering not more than one-half of the roof area, an integral depending flange on said sheet around at least three sides of said opening, inwardly extending flange portions on the lower edges of said flange forming an angle therewith, a substantially rectangular frame fitted into said angle and supported by said flange portions below the plane of the cover sheet, and defining the margins of a skylight opening, a substantially rectangular glass panel fitted into said frame to close said skylight opening, said glass panel including a metal frame and an outwardly extending flange on said metal frame adapted to rest on said rectangular frame when the glass panel is in its operative position, and a substantially rigid non-transparent panel mounted above said glass panel and movable independently thereof into and out of position to close said skylight opening.

JOHN VOTYPKA.